(12) United States Patent
Trainoff (10) Patent No.: US 11,567,003 B2
(45) Date of Patent: Jan. 31, 2023

(54) MEASURING DYNAMIC LIGHT SCATTERING OF A SAMPLE

(71) Applicant: Wyatt Technology Corporation, Goleta, CA (US)

(72) Inventor: Steven P. Trainoff, Santa Barbara, CA (US)

(73) Assignee: WYATT TECHNOLOGY CORPORATION, Goleta, CA (US)

( * ) Notice: Subject to any disclaimer, the term of this patent is extended or adjusted under 35 U.S.C. 154(b) by 180 days.

(21) Appl. No.: 17/017,671

(22) Filed: Sep. 10, 2020

(65) Prior Publication Data
US 2021/0072152 A1 Mar. 11, 2021

Related U.S. Application Data

(60) Provisional application No. 62/898,532, filed on Sep. 10, 2019.

(51) Int. Cl.
| | | |
|---|---|---|
| G01N 21/00 | (2006.01) | |
| G01N 21/49 | (2006.01) | |
| G01N 21/39 | (2006.01) | |
| G01N 21/03 | (2006.01) | |
| G01N 21/17 | (2006.01) | |

(52) U.S. Cl.
CPC ......... *G01N 21/49* (2013.01); *G01N 21/0332* (2013.01); *G01N 21/39* (2013.01); *G01N 2021/1744* (2013.01); *G01N 2021/396* (2013.01)

(58) Field of Classification Search
CPC .... G01N 21/49; G01N 21/0332; G01N 21/39; G01N 2021/1744; G01N 2021/396; G01N 2015/0038; G01N 15/0211; G01N 21/51; G01N 2015/0222

USPC ......................................................... 356/337
See application file for complete search history.

(56) References Cited

U.S. PATENT DOCUMENTS

| | | |
|---|---|---|
| 7,397,036 B2 | 7/2008 | Robertson et al. |
| 7,623,225 B2 | 11/2009 | Robertson, Jr. et al. |
| 7,872,749 B2 | 1/2011 | Robertson et al. |

(Continued)

OTHER PUBLICATIONS

International Search Report PCTUS2021049973, dated Dec. 16, 2021.
Written Opinion for PCTUS2021049973, dated Dec. 16, 2021.

*Primary Examiner* — Md M Rahman
(74) *Attorney, Agent, or Firm* — Leonard T. Guzman (57) ABSTRACT

The present disclosure describes a method and apparatus of measuring dynamic light scattering of a sample. In an embodiment, the apparatus includes a platen, a light source underneath the platen and configured to emit emitted light through the platen and into the sample, collector optics underneath the platen and configured to capture scattered light, and an optical absorber configured to be in contact with the sample, configured to absorb transmitted light, and configured to redirect reflected light away from the collector optics. In an embodiment, the method includes depositing a sample on a platen, emitting emitted light from a light source underneath the platen through the platen and into the sample, capturing via collector optics underneath the platen scattered light, contacting the sample with an optical absorber, absorbing via the absorber transmitted light, and redirecting via the absorber reflected light away from the collector optics.

20 Claims, 9 Drawing Sheets

(56) References Cited

U.S. PATENT DOCUMENTS

| | | | |
|---|---|---|---|
| 8,189,199 B2 | 5/2012 | Robertson, Jr. et al. | |
| 8,223,338 B2 | 7/2012 | Robertson, Jr. et al. | |
| 2001/0012429 A1* | 8/2001 | Wach | G02B 6/262 |
| | | | 385/115 |
| 2015/0355088 A1* | 12/2015 | Smart | G01N 21/49 |
| | | | 356/336 |
| 2019/0106662 A1 | 4/2019 | Trainoff et al. | |

* cited by examiner

| Sample | Radius (nm) |
|---|---|
| 100nm PSL | 52.5 |
| 30nm PSL | 14.9 |
| Pierce BSA | 3.9 |
| 1.0 mg/ml Lysozyme | 1.7 |
| 0.125 mg/ml Lysozyme | 1.3 |

FIG. 5

MEASURING DYNAMIC LIGHT SCATTERING OF A SAMPLE

PRIORITY

This application claims priority to U.S. Provisional Patent Application No. 62/898,532, filed Sep. 10, 2019.

BACKGROUND

The present disclosure relates to dynamic light scattering, and more specifically, to measuring dynamic light scattering of a sample.

SUMMARY

The present disclosure describes a method and apparatus of measuring dynamic light scattering of a sample. In an exemplary embodiment, the apparatus includes (1) a platen including a top surface and a bottom surface, where the top surface of the platen is configured to hold a sample, (2) a light source underneath the platen and configured to emit emitted light through the platen and into the sample, (3) collector optics underneath the platen and configured to capture scattered light scattered by the sample, and (4) an optical absorber above the platen, configured to be in contact with the sample, configured to absorb transmitted light transmitted through the sample, and configured to redirect reflected light reflected from an interface between the sample and a bottom surface of the absorber away from the collector optics. In an exemplary embodiment, the method includes (1) depositing a sample on a platen comprising a top surface and a bottom surface, where the top surface of the platen is configured to hold the sample, (2) emitting emitted light from a light source underneath the platen through the platen and into the sample, (3) capturing via collector optics underneath the platen scattered light scattered by the sample, (4) contacting the sample with an optical absorber above the platen, (5) absorbing via the absorber transmitted light transmitted through the sample, and (6) redirecting via the absorber reflected light reflected from an interface between the sample and a bottom surface of the absorber away from the collector optics.

DETAILED DESCRIPTION

The present disclosure describes a method and apparatus of measuring dynamic light scattering of a sample. In an exemplary embodiment, the apparatus includes (1) a platen including a top surface and a bottom surface, where the top surface of the platen is configured to hold a sample, (2) a light source underneath the platen and configured to emit emitted light through the platen and into the sample, (3) collector optics underneath the platen and configured to capture scattered light scattered by the sample, and (4) an optical absorber above the platen, configured to be in contact with the sample, configured to absorb transmitted light transmitted through the sample, and configured to redirect reflected light reflected from an interface between the sample and a bottom surface of the absorber away from the collector optics. In an exemplary embodiment, the method includes (1) depositing a sample on a platen comprising a top surface and a bottom surface, where the top surface of the platen is configured to hold the sample, (2) emitting emitted light from a light source underneath the platen through the platen and into the sample, (3) capturing via collector optics underneath the platen scattered light scattered by the sample, (4) contacting the sample with an optical absorber above the platen, (5) absorbing via the absorber transmitted light transmitted through the sample, and (6) redirecting via the absorber reflected light reflected from an interface between the sample and a bottom surface of the absorber away from the collector optics.

In an embodiment, the apparatus and the method make measurements entirely in a backscattered configuration and do not adjust the path length. In an example, when the absorber contacts the top surface of the platen, a sandwich is formed consisting of the lower window/platen, the sample, and the upper absorber. For example, the apparatus has free interfaces only on the sides which are effectively overflow regions, with the laser and scattered light only going through a well-polished optical surface and the sample and the transmitted beam being collected with an absorber, where the laser never passes through the uncontrolled meniscus. Also, for example, the top and bottom optical surfaces do not need to be parallel, since they could be arranged to have a known angle that spoils etaloning and sends light reflected from the top surface away from the measurement sensor.

Definitions

Particle

A particle may be a constituent of a liquid sample aliquot. Such particles may be molecules of varying types and sizes, nanoparticles, virus like particles, liposomes, emulsions, bacteria, and colloids. These particles may range in size on the order of nanometer to microns.

Analysis of Macromolecular or Particle Species in Solution

The analysis of macromolecular or particle species in solution may be achieved by preparing a sample in an appropriate solvent and then injecting an aliquot thereof into a separation system such as a liquid chromatography (LC) column or field flow fractionation (FFF) channel where the different species of particles contained within the sample are separated into their various constituencies. Once separated, generally based on size, mass, or column affinity, the samples may be subjected to analysis by means of light scattering, refractive index, ultraviolet absorption, electrophoretic mobility, and viscometric response.

Current Technologies

Current technology describe measurements performed in transmission. For example, a current sample holder can dynamically adjust the gap between top and bottom windows to find an optimal spacing for absorption measurement to balance the measurement linearity with sensitivity, with short path lengths giving linear results and low sensitivity and with long path lengths giving good sensitivity and nonlinear results. Thus, adjusting the path length is critical for such current absorption techniques.

Other current technology, such as a blade cell, allows light to go through the air-liquid interface and allows the light to bounce around the droplet in an uncontrolled fashion. Such current technology is prone to acoustic pickup from vibrations in the lab. Adjusting the path length is irrelevant for a backscattered dynamic light scattering/static light scattering (DLS/SLS) measurement.

Thus, there is a need to measure dynamic light scattering of a sample in a reproducible manner.

Figure 1A:
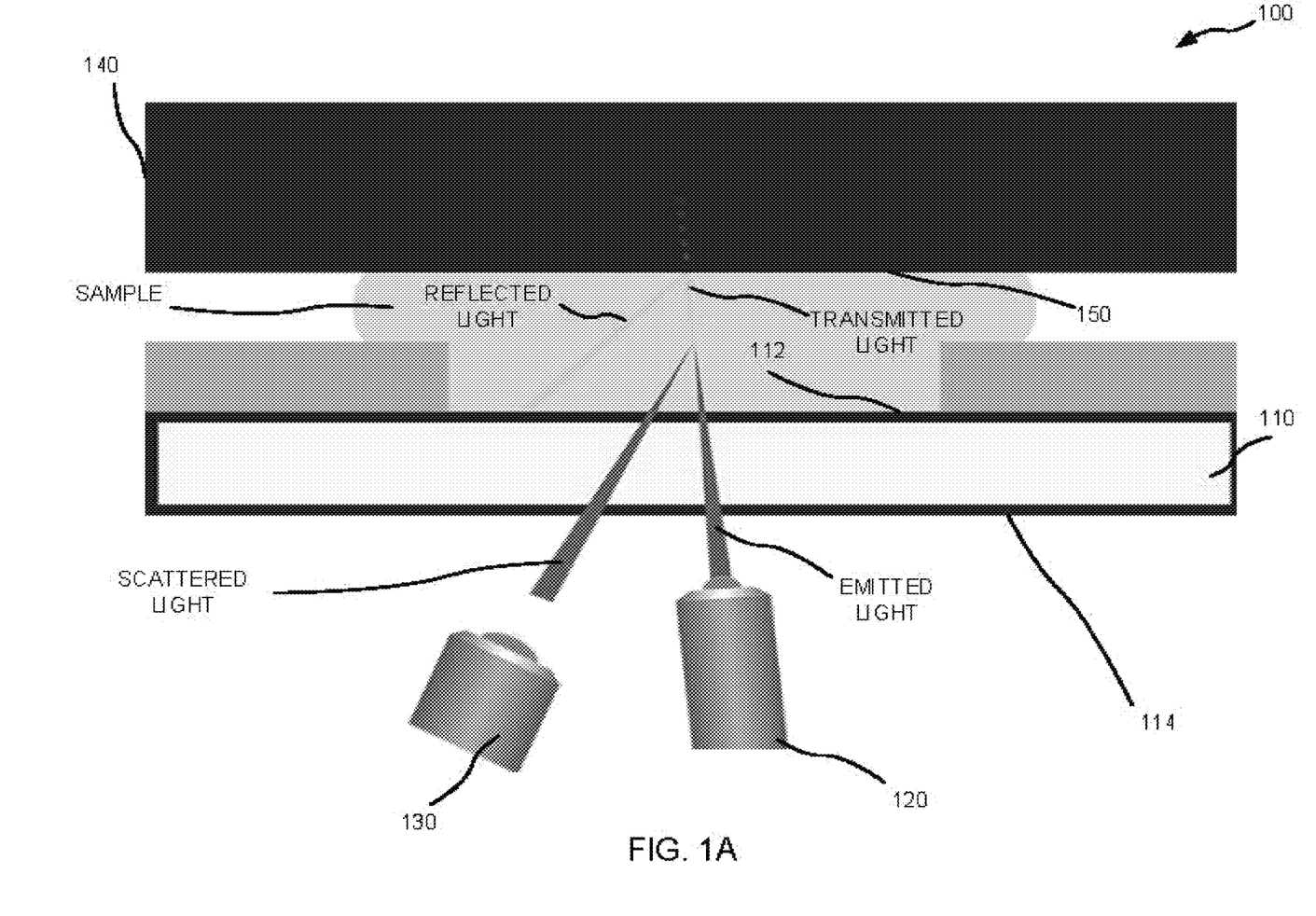
FIG. 1A depicts an apparatus in accordance with an exemplary embodiment.
Figure 1B:
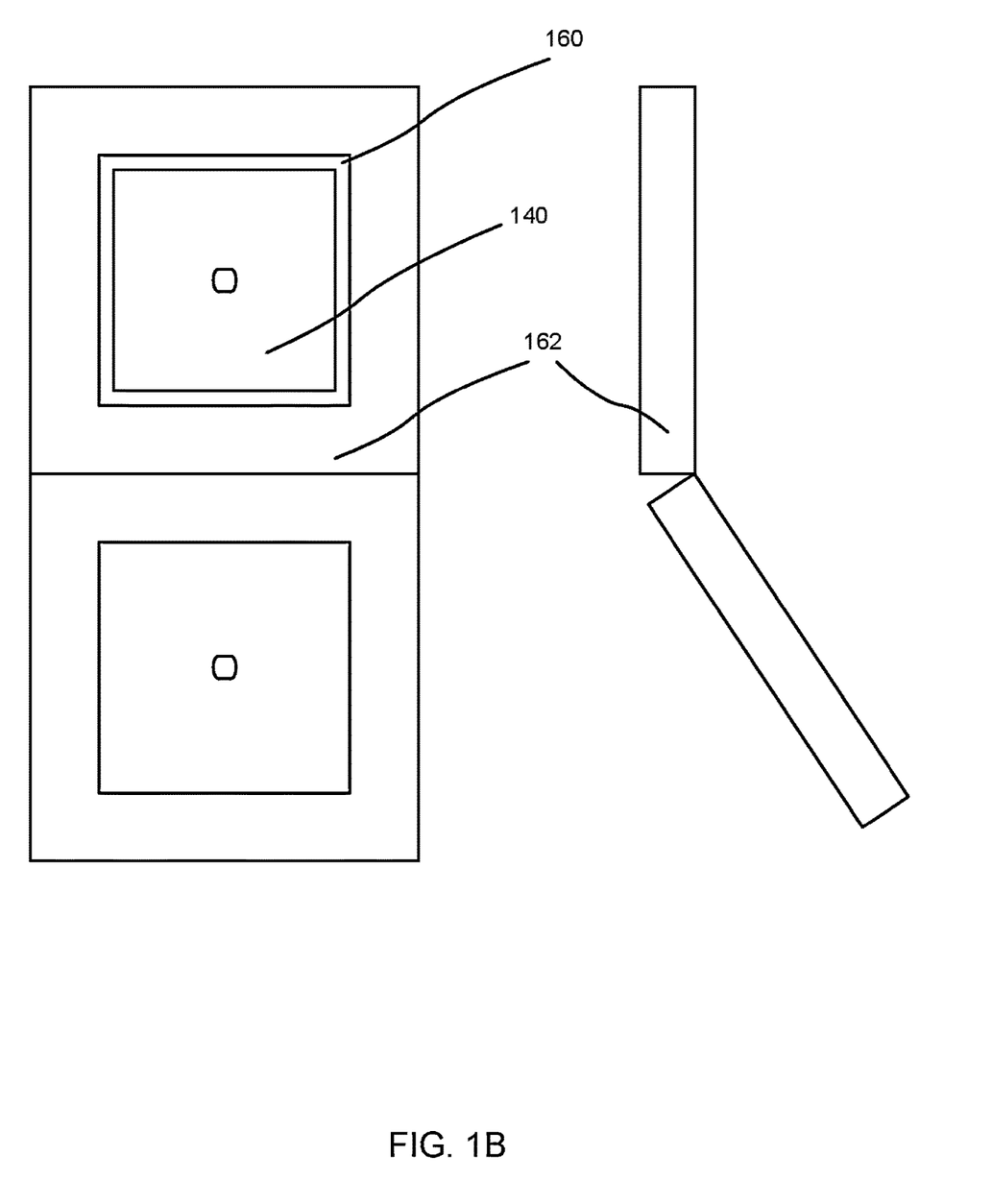
FIG. 1B depicts an apparatus in accordance with an embodiment.
Figure 1C:
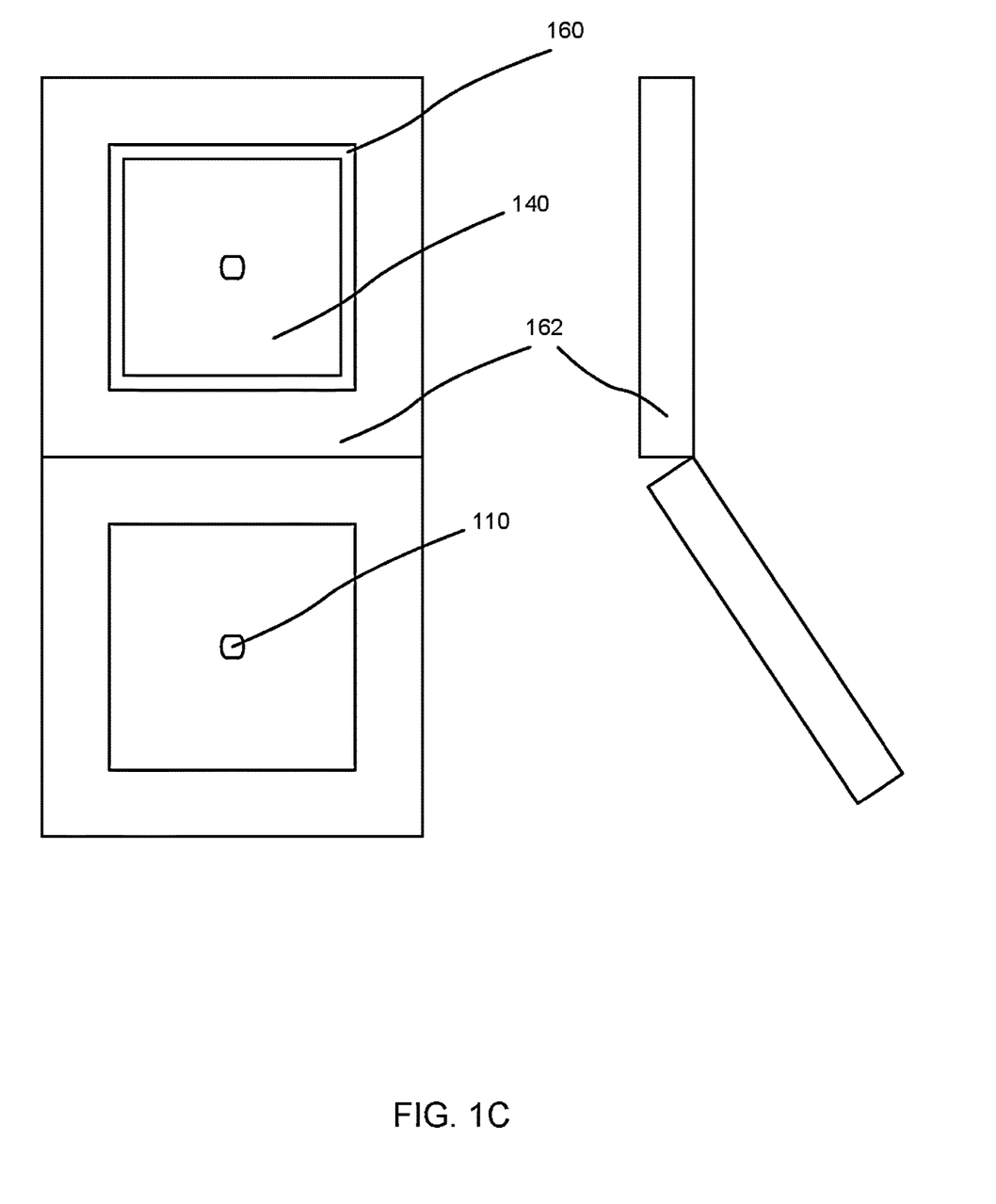
FIG. 1C depicts an apparatus in accordance with an embodiment.

Referring to FIG. 1A, FIG. 1B, and FIG. 1C, in an exemplary embodiment, the apparatus includes a platen 110 including a top surface 112 and a bottom surface 114, where top surface 112 of platen 110 is configured to hold a sample, a light source 120 underneath platen 110 and configured to emit emitted light through platen 110 and into the sample, collector optics 130 underneath platen 110 and configured to capture scattered light scattered by the sample, and an optical absorber 140 above platen 110, configured to be in contact with the sample, configured to absorb transmitted light transmitted through the sample, and configured to redirect reflected light reflected from an interface 150 between the sample and a bottom surface 142 of absorber 140 away from collector optics 130.

Figure 2:
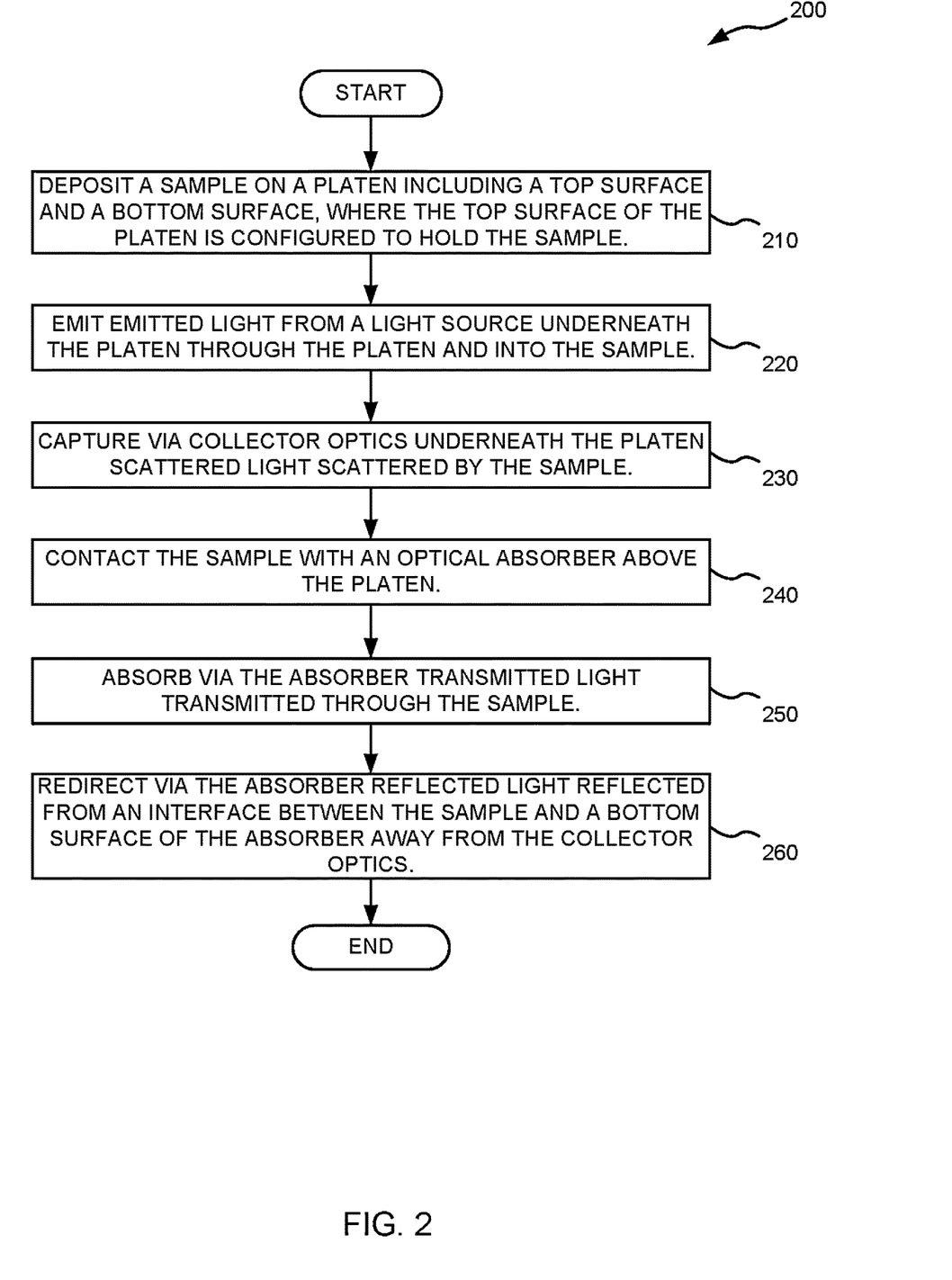
FIG. 2 depicts a method in accordance with an exemplary embodiment.

Referring to FIG. 2, in an exemplary embodiment, the method includes a step 210 of depositing a sample on a platen including a top surface and a bottom surface, where the top surface of the platen is configured to hold the sample, a step 220 of emitting emitted light from a light source underneath the platen through the platen and into the sample, a step 230 of capturing via collector optics underneath the platen scattered light scattered by the sample, a step 240 of contacting the sample with an optical absorber above the platen, a step 250 of absorbing via the absorber transmitted light transmitted through the sample, and a step 260 of redirecting via the absorber reflected light reflected from an interface between the sample and a bottom surface of the absorber away from the collector optics.

Platen

In an embodiment, platen 110 includes a window. In a particular embodiment, platen 110 is a window. In an embodiment, top surface 112 of platen 110 and bottom surface 114 of platen 110 include polished optical surfaces. In an embodiment, top surface 112 of platen 110 and bottom surface 114 of platen 110 are polished optical surfaces. In an embodiment, platen 110 is transparent. In an embodiment, top surface 112 of platen 110 and bottom surface 114 of platen 110 include flat surfaces. In an embodiment, top surface 112 of platen 110 and bottom surface 114 of platen 110 are flat surfaces.

For example, platen 110 may be fused silica or sapphire to ensure that the optical surface is durable.

Light Source

In an embodiment, light source 120 is configured to focus the emitted light into the sample. In a particular embodiment, light source 120 is configured to focus the emitted light into the interior of the sample. In an embodiment, light source 120 includes a laser. In a particular embodiment, light source 120 is a laser. In an embodiment, the laser is coupled to a single mode, polarization preserving optical fiber. In an embodiment, light source 120 is configured to focus the emitted light to have a beam waist of less than 0.5 mm within the sample. In a particular embodiment, light source 120 is configured to focus the emitted light to have a beam waist of less than 0.5 mm within the interior of the sample.

Collector Optics

In an embodiment, collector optics 130 includes (a) an optical fiber and (b) at least one lens coupled to the fiber, where one of the fiber and the at least one lens is aligned to a focus of light source 120 within the sample. In a particular embodiment, collector optics 130 includes (a) an optical fiber and (b) at least one lens coupled to the fiber, where one of the fiber and the lens is aligned to a focus of light source 120 within the interior of the sample. In an embodiment, the fiber includes one of a single mode optical fiber and a multi-mode optical fiber. In a particular embodiment, the fiber is one of a single mode optical fiber and a multi-mode optical fiber.

Optical Absorber

In an embodiment, optical absorber 140 is chosen to be able to absorb energy of the transmitted light within optical absorber 140, and optical absorber 140 is chosen to be able to conduct the energy away from the sample. In an embodiment, optical absorber 140 is chosen to be able to absorb the energy within optical absorber 140 to an optical depth of less than or equal to 5 mm. In an embodiment, optical absorber 140 includes neutral density glass. In a particular embodiment, optical absorber 140 is neutral density glass.

Optical Absorber Carrier

Referring to FIG. 1B and FIG. 1C, in a further embodiment, the apparatus further includes an optical absorber carrier 160, where carrier 160 contains optical absorber 140. In an embodiment, carrier 160 includes one of at least one swing arm 162, a vertical sliding block, and a horizontal sliding block. In a particular embodiment, carrier 160 is one of at least one swing arm 162, a vertical sliding block, and a horizontal sliding block.

Wiper

In a further embodiment, the apparatus further includes a wiper configured to wipe top surface 112 of platen 110. In an embodiment, the apparatus further includes a cleaning fluid injector configured to release cleaning fluid onto top surface 112 of platen 110. In an embodiment, the wiper is configured to wipe the cleaning fluid against top surface 112 of platen 110, thereby cleaning top surface 112.

Temperature Regulation

In a further embodiment, the apparatus further includes at least one temperature regulator configured to control a temperature of at least one of absorber 140 and platen 110, thereby regulating a sample temperature of the sample. In a further embodiment, the method further includes controlling a temperature of at least one of the absorber and the platen to a temperature value via a temperature regulator, thereby regulating a sample temperature of the sample, where the temperature value is one of a set value and a varying value that varies over time. For example, the apparatus and method could be well suited for fast thermal ramping to study protein aggregation or unfolding since thee sample would be in good thermal contact with the top and bottom plates, which themselves are good thermal conductors. Also, the apparatus and method allow for adjusting the gap between the bottom and top windows to be 1 mm or less, allowing for measurements of <1 µL.

One problem with a thermal ramping measurement is that dissolved gases tend to come out of solution as the temperature is increased. The apparatus having a low sample volume minimizes the size and number of bubbles that can form. Bubble formation is a relatively slow process. With fast enough ramps via the apparatus and method, it could be possible to complete the ramp before bubbles occur or before evaporation can change the sample concentration.

EXAMPLE

Figure 3A:
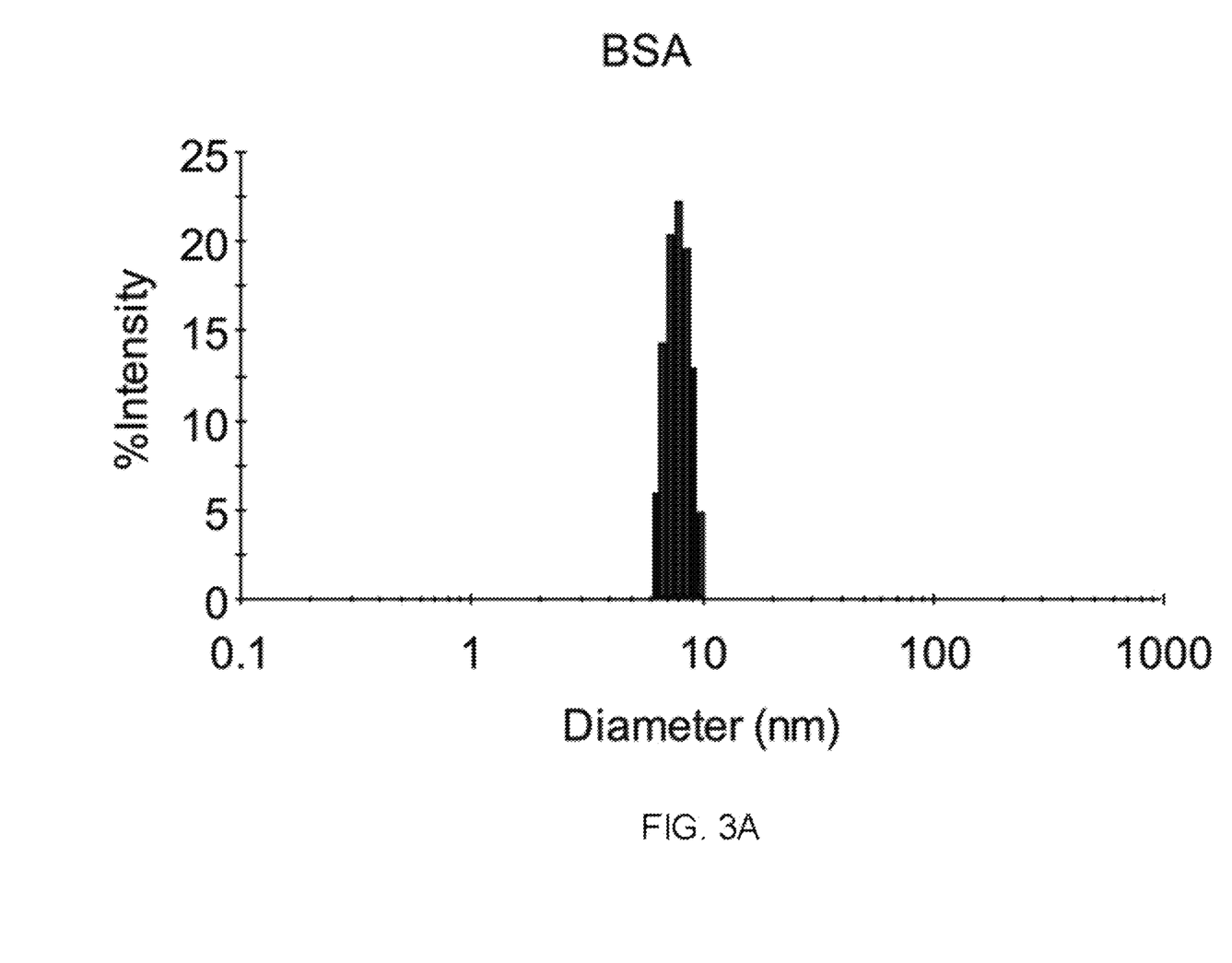
FIG. 3A depicts a graph in accordance with an embodiment.
Figure 3B:
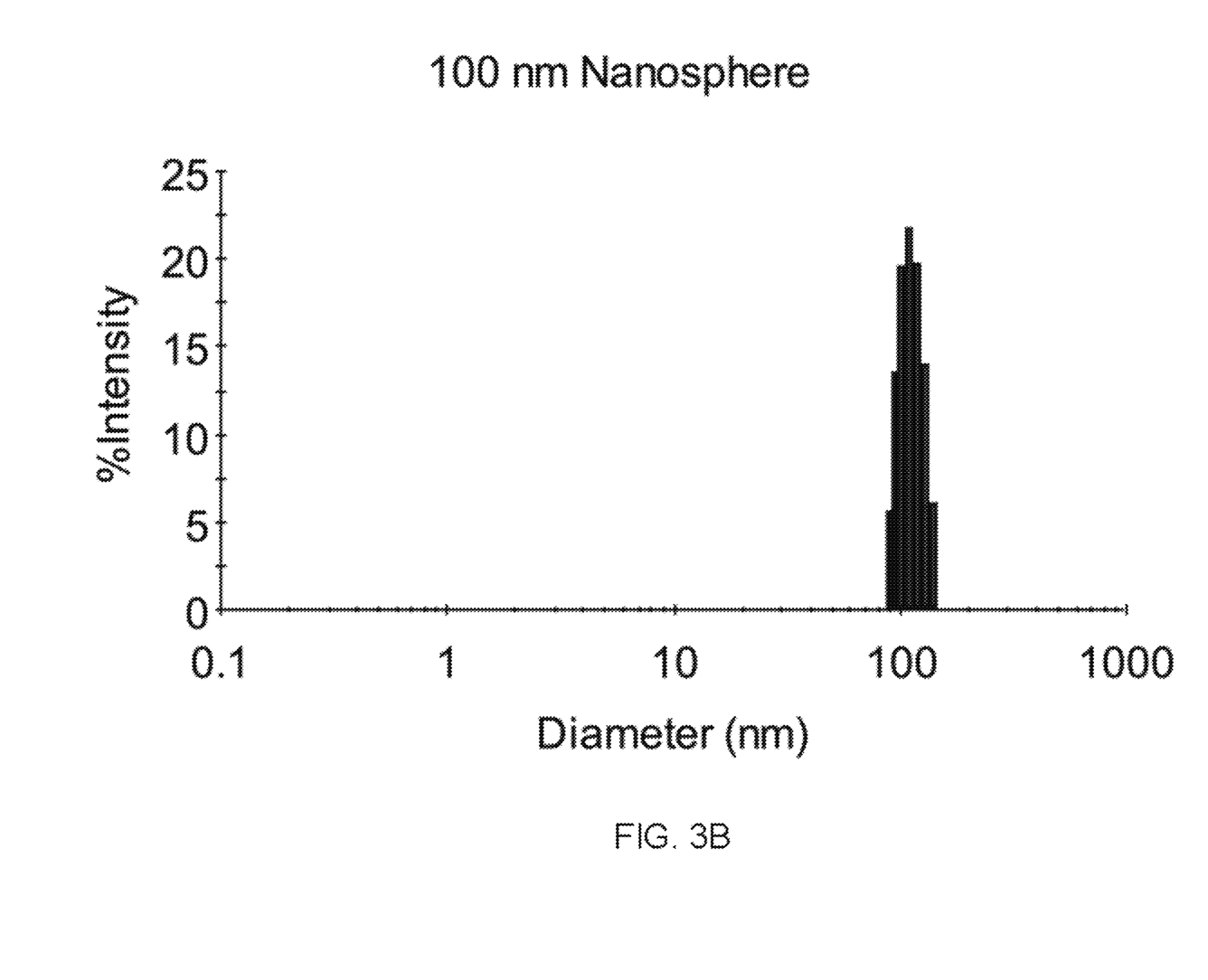
FIG. 3B depicts a graph in accordance with an embodiment.
Figure 3C:
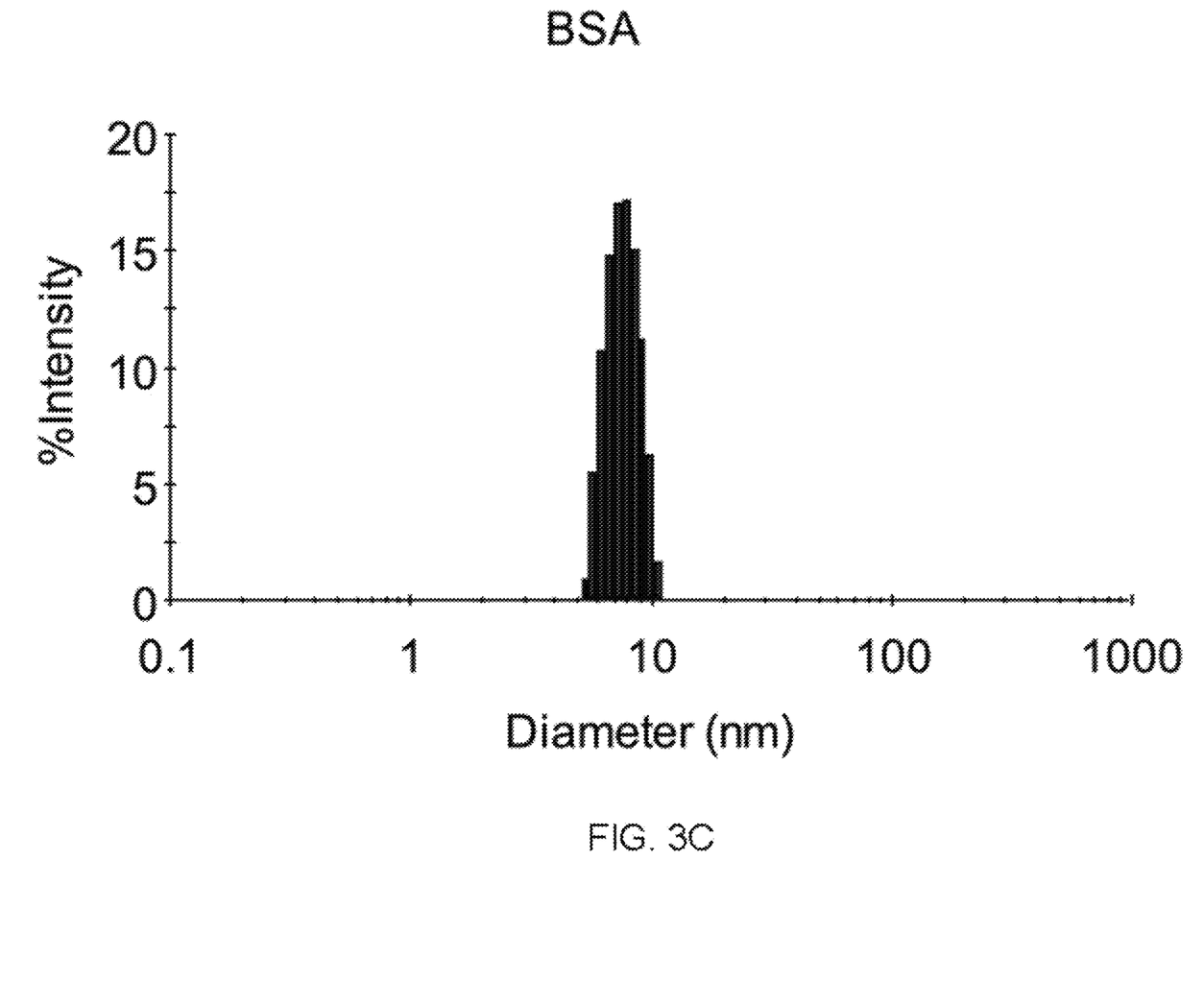
FIG. 3C depicts a graph in accordance with an embodiment.

For example, FIG. 3A depicts dynamic light scattering measurements made by the apparatus and method on BSA, demonstrating the reproducibility of data gathered by the apparatus and method. In a further example, FIG. 3B depicts dynamic light scattering measurements made by the apparatus and method on a sample of large particles, 100 nm nanospheres (i.e., polystyrene latex beads), after having made measurement on BSA and cleaning top surface 112 of platen 110 and the bottom surface of absorber 140, demonstrating the continued reproducibility of data gathered by the apparatus and method. In a further example, FIG. 3C depicts dynamic light scattering measurements made by the apparatus and method on BSA, after having made measurement on the sample of large particles, 100 nm nanospheres (i.e., polystyrene latex beads) and cleaning top surface 112 of platen 110 and the bottom surface of absorber 140, demonstrating the continued reproducibility of data gathered by the apparatus and method.

Figure 4:
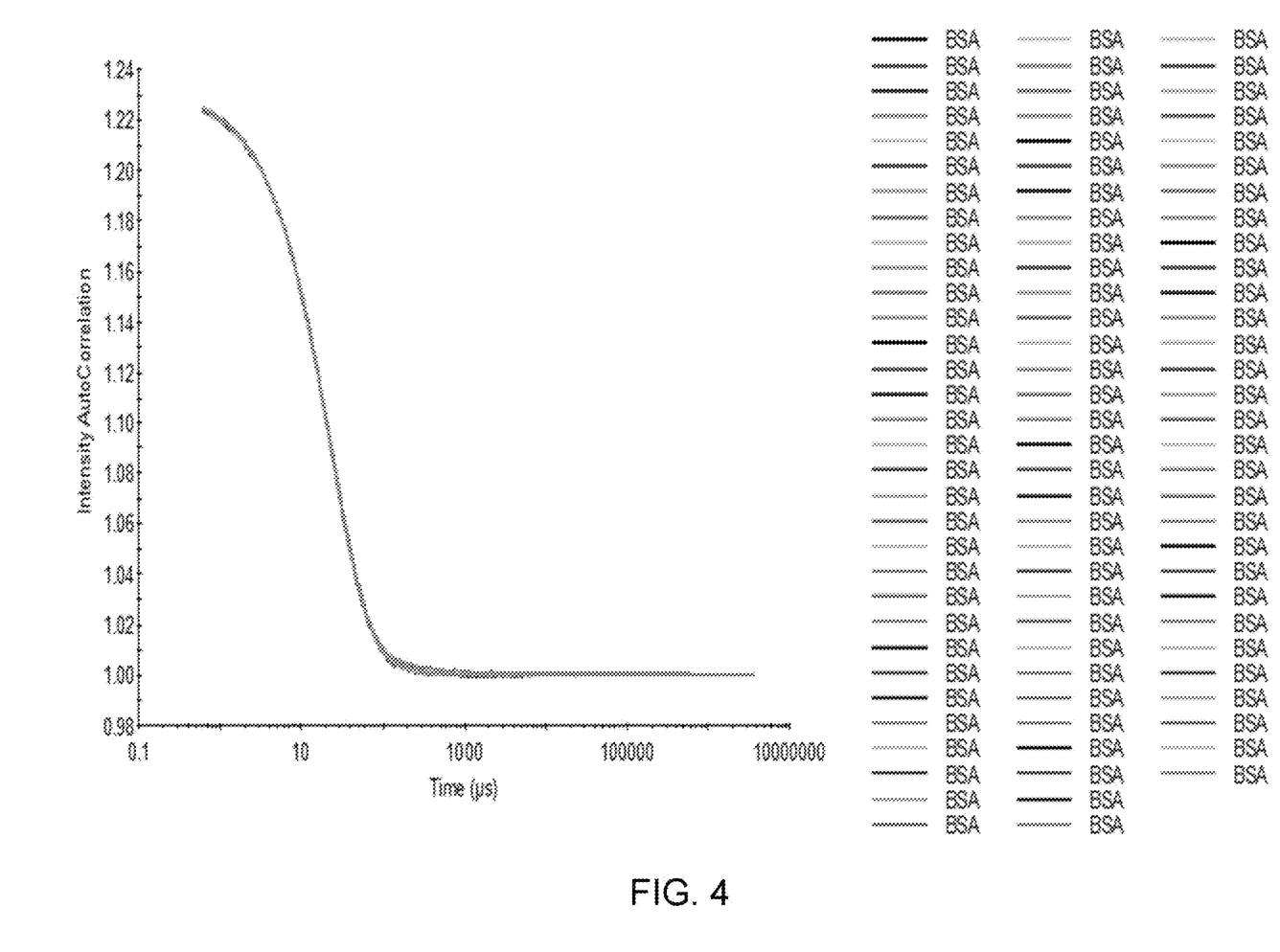
FIG. 4 depicts a graph in accordance with an embodiment.
Figure 5:
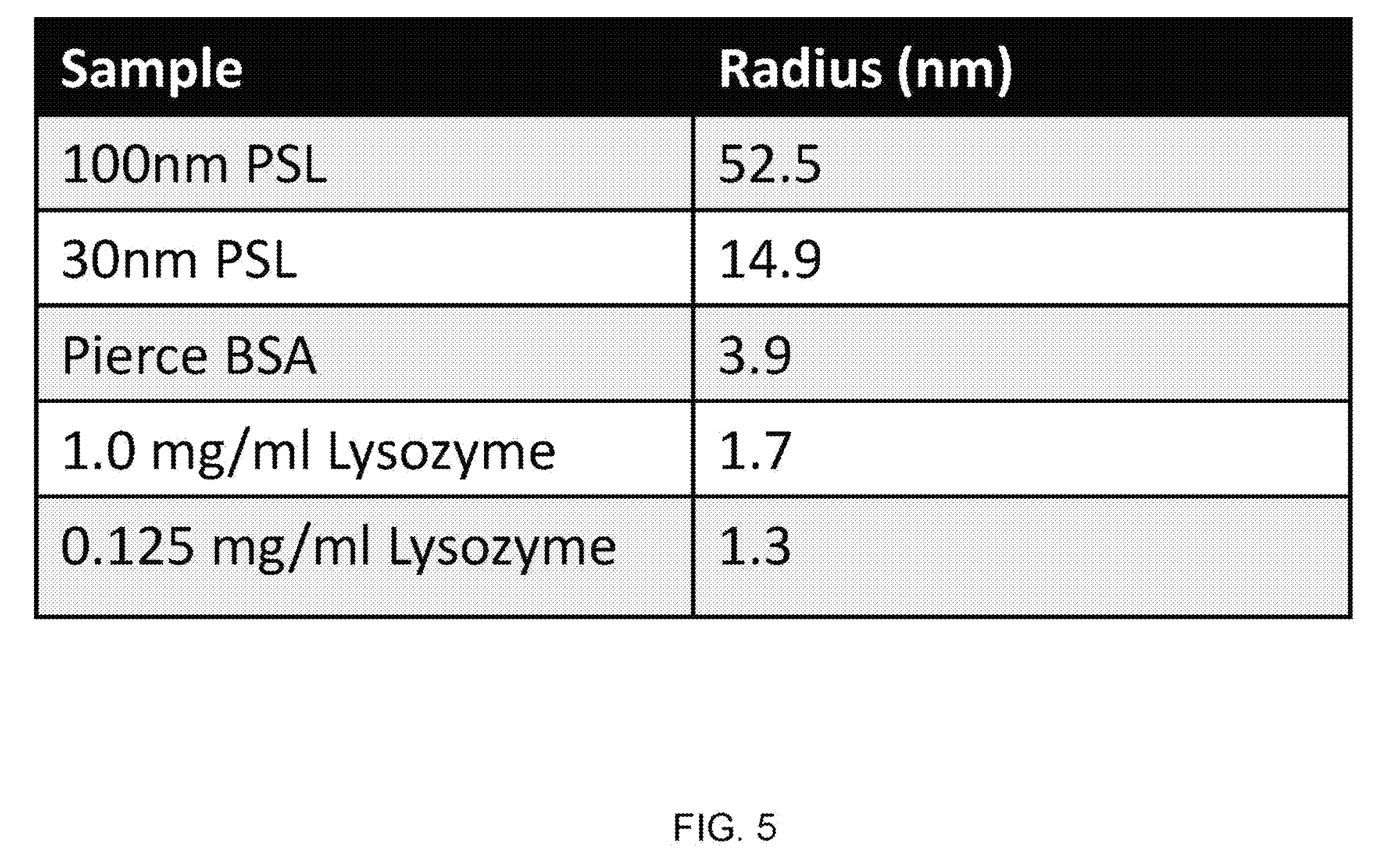
FIG. 5 depicts data in accordance with an embodiment.

In another example, FIG. 4 depicts an overlay of 94 data collections of 50 sec (1.3 hour) of Pierce BSA measured by the apparatus and method, demonstrating the reproducibility of data gathered by the apparatus and method. Also, FIG. 5 demonstrates that the apparatus and method can accurately measure the radius of particles in various samples.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. An apparatus comprising:
   a platen comprising a top surface and a bottom surface, wherein the top surface of the platen is configured to hold a sample;
   a light source underneath the platen and configured to emit emitted light through the platen and into the sample;
   collector optics underneath the platen and configured to capture scattered light scattered by the sample; and
   an optical absorber above the platen, configured to be in contact with the sample, configured to absorb transmitted light transmitted through the sample, and configured to redirect reflected light reflected from an interface between the sample and a bottom surface of the absorber away from the collector optics.

2. The apparatus of claim 1 wherein the platen comprises a window.

3. The apparatus of claim 1 wherein the top surface of the platen and the bottom surface of the platen comprise polished optical surfaces.

4. The apparatus of claim 3 wherein the top surface of the platen and the bottom surface of the platen comprise flat surfaces.

5. The apparatus of claim 1 wherein the light source is configured to focus the emitted light into the sample.

6. The apparatus of claim 5 wherein the light source comprises a laser.

7. The apparatus of claim 6 wherein the laser is coupled to a single mode, polarization preserving optical fiber.

8. The apparatus of claim 5 wherein the light source is configured to focus the emitted light to have a beam waist of less than 0.5 mm within the sample.

9. The apparatus of claim 1 wherein the collector optics comprises:
   an optical fiber; and
   at least one lens coupled to the fiber,
      wherein one of the fiber and the at least one lens is aligned to a focus of the light source within the sample.

10. The apparatus of claim 9 wherein the fiber comprises one of a single mode optical fiber and a multi-mode optical fiber.

11. The apparatus of claim 1
   wherein the optical absorber is to absorb energy of the transmitted light within the optical absorber, and
   wherein the optical absorber is chosen to be able to conduct the energy away from the sample.

12. The apparatus of claim 11 wherein the optical absorber is to absorb the energy within the optical absorber to an optical depth of less than or equal to 5 mm.

13. The apparatus of claim 11 wherein the optical absorber comprises neutral density glass.

14. The apparatus of claim 1 further comprising an optical absorber carrier,
   wherein the carrier contains the optical absorber.

15. The apparatus of claim 14 where in the carrier comprises one of at least one swing arm, a vertical sliding block, and a horizontal sliding block.

16. The apparatus of claim 1 further comprising
   a wiper configured to wipe the top surface of the platen.

17. The apparatus of claim 16 further comprising
   a cleaning fluid injector configured to release cleaning fluid onto the top surface of the platen.

18. The apparatus of claim 1 further comprising
   at least one temperature regulator configured to control a temperature of at least one of the absorber and the platen, thereby regulating a sample temperature of the sample.

19. A method comprising:
   depositing a sample on a platen comprising a top surface and a bottom surface,
      wherein the top surface of the platen is configured to hold the sample;

emitting emitted light from a light source underneath the platen through the platen and into the sample;
capturing via collector optics underneath the platen scattered light scattered by the sample;
contacting the sample with an optical absorber above the platen;
absorbing via the absorber transmitted light transmitted through the sample; and
redirecting via the absorber reflected light reflected from an interface between the sample and a bottom surface of the absorber away from the collector optics.

20. The method of claim 19 further comprising
controlling a temperature of at least one of the absorber and the platen to a temperature value via a temperature regulator, thereby regulating a sample temperature of the sample,
wherein the temperature value is one of a set value and a varying value that varies over time.

* * * * *